(12) United States Patent
Yuki (10) Patent No.: US 9,152,354 B2
(45) Date of Patent: Oct. 6, 2015

(54) PULL COPYING USING DOCUMENT-FILE IDENTIFIERS

(71) Applicant: KYOCERA Document Solutions Inc., Osaka (JP)

(72) Inventor: Akira Yuki, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/167,036

(22) Filed: Jan. 29, 2014

(65) Prior Publication Data

US 2014/0268220 A1  Sep. 18, 2014

Related U.S. Application Data

(60) Provisional application No. 61/789,001, filed on Mar. 15, 2013.

(51) Int. Cl.
*G06F 15/00* (2006.01)
*G06F 3/12* (2006.01)
*H04N 1/32* (2006.01)

(52) U.S. Cl.
CPC .............. *G06F 3/12* (2013.01); *G06F 3/1204* (2013.01); *G06F 3/1267* (2013.01); *G06F 3/1271* (2013.01); *G06F 3/1285* (2013.01); *G06F 3/1208* (2013.01); *H04N 1/32101* (2013.01); *H04N 2201/3226* (2013.01)

(58) Field of Classification Search
CPC ............................. G06F 3/1204; G06F 3/1267
USPC ........................................................ 358/1.15
See application file for complete search history.

(56) References Cited

U.S. PATENT DOCUMENTS

2007/0177824 A1* 8/2007 Cattrone et al. .............. 382/306
2009/0052804 A1* 2/2009 Lewis ........................... 382/298

* cited by examiner

*Primary Examiner* — Saeid Ebrahimi Dehkord
(74) *Attorney, Agent, or Firm* — McDonnell Boehnen Hulbert & Berghoff LLP (57) ABSTRACT

A method for printing a coded document includes receiving a print job, generating a document-file identifier, storing a document-file table entry into a document-file table, and printing a coded document. The document-file table entry includes the document-file identifier and the original document-file path. The coded document includes the received document-file data and the generated document-file identifier. A method for scanning a coded document includes receiving scan-document data indicative of a coded document, extracting the document-file identifier from the scan-document data, and searching a plurality of document-file table entries for the scanned document-file identifier. Each of the plurality of document-file table entries includes an entry document-file identifier and an entry document-file path, and may also include a table entry lifetime and/or a plurality of document-file variations. A pull-copy system includes an image forming apparatus, a storage unit, and a processor. The processor may perform the methods for printing and scanning a coded document.

20 Claims, 7 Drawing Sheets

FIG. 1

| Document-File Identifier | Document-File Path | Table Entry Lifetime |
|---|---|---|
|  211 | Path A 212 | Lifetime A 213 |
|  221 | Path B 222 | Lifetime B 223 |
|  231 | Path C 232 | Lifetime C 233 |

| Document-File Identifier | Document-File Path | Document-File Variations |
|---|---|---|
| 411 | Path A 412 | Variations of Document A 413 |
| 421 | Path B 422 | Variations of Document B 423 |
| 431 | Path C 432 | Variations of Document C 433 |

PULL COPYING USING DOCUMENT-FILE IDENTIFIERS

RELATED APPLICATIONS

This application claims priority to U.S. Provisional Application No. 61/789,001, filed Mar. 15, 2013, the entire contents of which are incorporated by reference herein.

FIELD

The present invention generally relates to methods and systems for pull copying using unique document-file identifiers.

BACKGROUND

Traditional document copying solutions utilize an image reading device, such as a scanner or a Multi-Function Peripheral (MFP), to scan each page of a document and reproduce each page using a printer with the information obtained during the scan. The process of scanning a paper document and printing a copy of the paper document often results in a degradation of the quality of the document. If the document being scanned is a text document, the sharpness of the text becomes "fuzzier" as a result of a loss of information during the scan and copy process. Similarly, documents containing printed images will suffer a loss of quality when reproduced using traditional scanning and copying methods.

Ideally, the pages in a document to be copied are individual sheets of paper which may be copied in quick succession using a Multi-Functioning Peripheral (MFP); however, even in this ideal condition, copies produced from scanning the pages will result in a document being reproduced at a lower quality than the scanned document. In less ideal situations, the document is more permanently bound—perhaps with staples or bound within a book—requiring each page to be manually scanned and copied. In addition to the added manual labor, pressing a book onto a flat scanning device does not provide a flat page to scan, and as a result the text near the binding of the book is skewed and the edge of the reproduced page is darkened.

In order to reproduce a document at its original image quality, a user likely needs to identify the printable file on a personal computer (PC), open the printable file, launch a printer driver, send the print job to the printer, and retrieve the newly printed document. These steps may take considerable time.

SUMMARY

A method for printing a coded document includes receiving a print job, generating a document-file identifier, storing a document-file table entry into a document-file table, and printing a coded document. The received print job includes document-file data indicative of a document stored at an original document-file path. The generated document-file identifier is a unique, device-readable identification that may be scanned and extracted from a coded document. The document-file table entry includes the document-file identifier and the original document-file path. The coded document includes the received document-file data and the generated document-file identifier.

In one embodiment, the document-file table entries within a document-file table entry also include a table entry lifetime. A table entry lifetime includes a number of lifetime parameters that specify the lifespan of the corresponding document-file table entry. When the lifespan of a document-file table entry expires, the document-file table entry is removed from the document file table. Some example lifetime parameters include an expiration date and time, a holding time, and a copy counter. An expiration date and time indicates a date that the document-file table entry is removed. A holding time indicates a remaining length of time before the document-file table entry is removed. A copy counter indicates a remaining number of copies before the document-file table entry is removed.

In another embodiment, the document-file table entries within a document-file table entry also include a plurality of document-file variations. Each of the document-file variations includes document-file paths that link to different variations of a specific document. A document-file variation includes a number of variation parameters that may be used to distinguish each variation of a specific document. Example variation parameters include a revision and a language. A revision is a previous or more recent edit of a document. A language specifies a translation of a document.

A method for scanning a coded document includes receiving scan-document data indicative of a coded document, extracting the document-file identifier from the scan-document data, and searching a plurality of document-file table entries for the scanned document-file identifier. The scan-document data includes a document-file identifier. Each of the plurality of document-file table entries includes a document-file identifier and a document-file path, and may also include a table entry lifetime and/or a plurality of document-file variations.

If the scanned document-file identifier does not match with any of the document-file table entries, then the operation stops and no documents are printed. Optionally, a notification is provided indicating that no document-file table entry relating to the scanned document-file identifier exists.

In one embodiment, if the scanned document-file identifier matches a document-file table entry within the plurality of document-file table entries, then the document-file table entry is examined to determine if a plurality of document-file variations are included in the document-file table entry. If no document-file variations are present in the document-file table entry, then the document file stored at the document-file path within the document-file table entry is retrieved and printed. Conversely, if document-file variations are indeed present in the document-file table entry, then a desired document-file variation is selected and printed.

A pull-copy system includes an image forming apparatus, a storage unit, and a processor. The image forming apparatus may be used to execute printing. The storage unit may be used to store document files located at document-file paths, and a document-file table. The processor is configured to perform a coded document printing method, such as the method for printing a coded document described above. The processor is also configured to perform a coded document scanning method, such as the method for scanning a coded document described above.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

The following detailed description includes references to the accompanying figures. In the figures, similar symbols typically identify similar components, unless context dictates otherwise. The examples described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1:
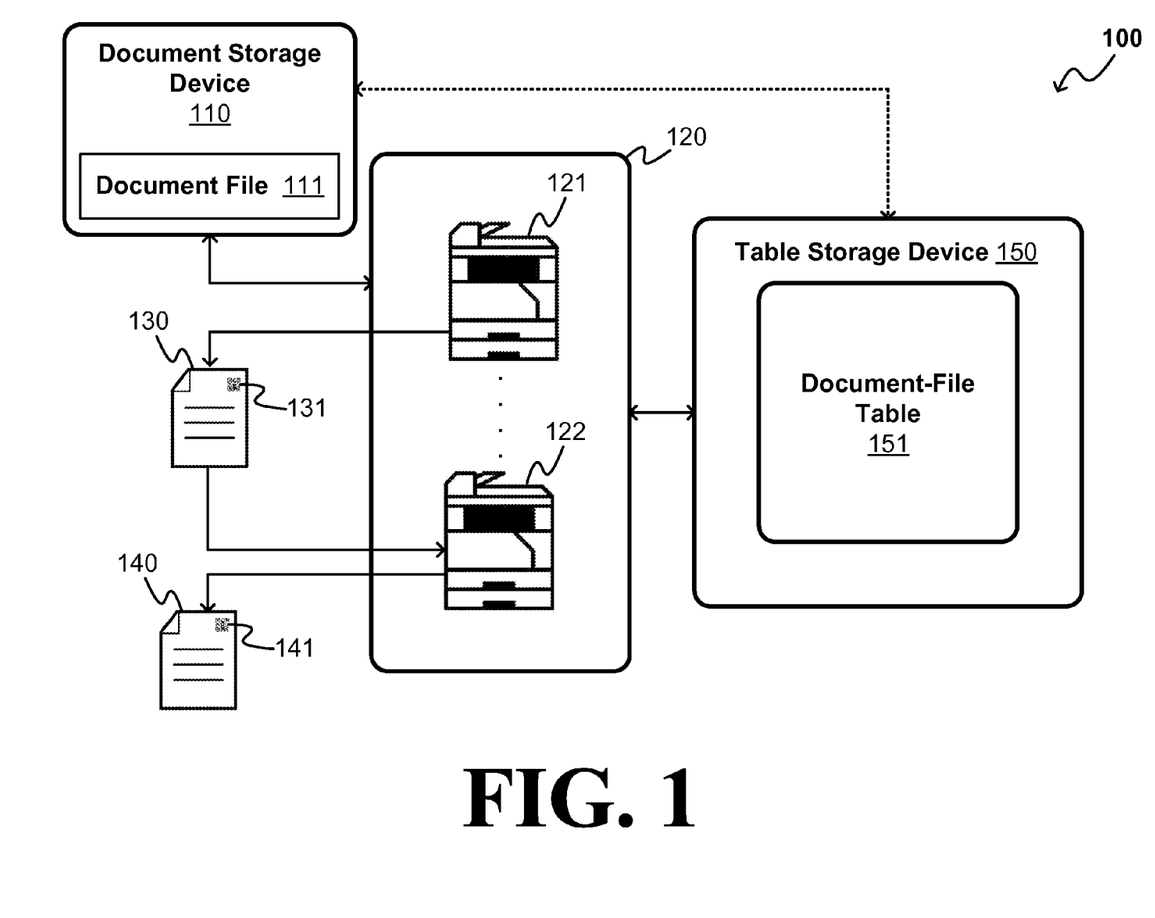
FIG. 1 is a schematic diagram of an overview of a pull-copy system according to one or more embodiments.

FIG. 1 is a schematic diagram of an overview of a pull-copy system 100 according to one or more embodiments. As shown, pull-copy system 100 includes a document storage device 110, a plurality of Multi-Function Peripherals (MFPs) 120, a coded document 130, a reproduced document 140, and a table storage device 150. In one embodiment, each of the MFPs in the plurality of MFPs 120 includes an image reading apparatus for scanning physical documents and an image forming apparatus for printing physical documents. Each of the MFPs in the plurality of MFPs 120 also includes communication links for receiving document-file data (from document storage device 110, for example), for communicating with table storage device 150, and for communicating with other MFPs within the plurality of MFPs 120.

The document storage device 110 may be any storage device that interfaces with the plurality of MFPs over a communication link; some examples of document storage device 110 include any combination of hard disk drives, solid state drives, servers, removable flash storage, private cloud storage, or public cloud storage. The document storage device 110 includes a plurality of document files, such as document file 111, each stored at unique locations herein referred to as "document-file paths." In one embodiment, the document storage device 110 and the table storage device 150 are separate storage devices that may or may not be directly connected, as indicated by the dotted connection shown in FIG. 1. In an alternative embodiment, the document storage device 110 and the table storage device 150 may be a unified storage device.

The document file 111 is an example document file stored on document storage device 110. The document file 111 has document-file data, representing the content of the document file, and a document-file path. The document file 110 may be one of a variety of document-file formats—such as .pdf, .doc, .ppt, or .xls—that may be sent to an image forming apparatus to be printed.

As depicted in FIG. 1, document file 111 may be sent to an MFP, such as a first MFP 121, in the plurality of MFPs 120. The document file 111 may be sent to MFP 121 over a network connection, such as an intranet or the Internet, provided MFP 121 is also connected to the same network. When document file 111 is sent to an MFP to be printed, it is referred to as a "print job." A print job is a command that may be executed by an image forming apparatus that includes document-file data and a document-file path of a document file.

When a print job is received at MFP 121, it is processed and a document-file identifier 131 is generated. The document-file identifier 131 is a unique, device-readable identification that may be analyzed by an MFP in the plurality of MFPs 120. Some examples of document-file identifiers include one-dimensional linear barcodes, two-dimensional matrix barcodes, text identifiers that may be read using optical character recognition (OCR), radio-frequency identification tags, and hidden codes embedded in images. The document-file identifier 131 may be read by an image reading device, such as an optical scanner, if the document-file identifier 131 is a barcode, a text identifier, or a hidden code embedded in an image. Alternatively, the document-file identifier 131 may be read by an electromagnetic induction device, such as an RFID tag reader, if the document-file identifier 131 is an RFID tag. The process of reading the document-file identifier 131, regardless of the type of document-file identifier 131 used or of the technology used to read the document-file identifier 131, is hereinafter referred to as "scanning" the document-file identifier 131.

After the document-file identifier 131 has been generated, the document-file path and the document-file identifier 131 of the received print job are sent to the table storage device 150. Table storage device 150 has a document-file table 151, which stores at least the document-file identifier 131 and the document-file path as a document-file table entry. A document-file table entry may include other information, such as a table entry lifetime and/or document-file variations, which are depicted in FIGS. 2-5 and described later in this section. The table storage device 150 may be any storage device that interfaces with the plurality of MFPs over a communication link; some examples of table storage devices 150 include any combination of hard disk drives, solid state drives, servers, removable flash storage, private cloud storage, or public cloud storage. The stored document-file table 151 may be searched by document-file identifier; in other words, the document-file table 151 is indexed by the stored document-file identifiers, such that a search using a specific document-file identifier, such as document-file identifier 131, would retrieve an entire document-file table entry corresponding to the document-file identifier 131.

As depicted in FIG. 1, once the document-file table entry has been created and stored in the document-file table 151 on the table storage device 150, MFP 121 prints the coded document 130, which comprises the document file 111 and the document-file identifier 131. The document-file identifier 131 may be printed on a front side, back side, or both sides of any of the pages of coded document 130 being produced by MFP 121.

In operation, coded document 130 may be scanned by a second MFP 122 in the plurality of MFPs 120 to read in the document-file identifier 131. Using the scanned document-file identifier 131, the second MFP 122 may then communicate with the table storage device 150 to find a representation of a matching document-file identifier 131 in the document-file table 151. If the representation of the matching document-file identifier 131 is found within document-file table 151, the entire table entry containing at least the document-file path is retrieved and sent back to the second MFP 122. The second MFP 122 then retrieves the document file—which is stored at the document-file path in the retrieved document-file table entry on the document storage device 110 (in this example, document file 111)—and prints the retrieved document file. In this example, the operation of printing coded document 130, reading document-file identifier 131, and printing reproduced document 140 produces a copy of document file 111. In some examples, reproduced document 140 may include a document-file identifier 141, such as a barcode, for future printing using the present operation. Note that the description regarding the operation of pull-copy system 100 as shown in FIG. 1 is a simplified overview of a pull-copy system 100, and is presented in a basic example for clarity. Alternative embodiments may impose limitations on a number of copies that may be produced using a specific document-file identifier, for example, or may or may not print the exact same document file that was used to produce coded document 130. Some of these alternative embodiments are described later in this section.

Figure 2:
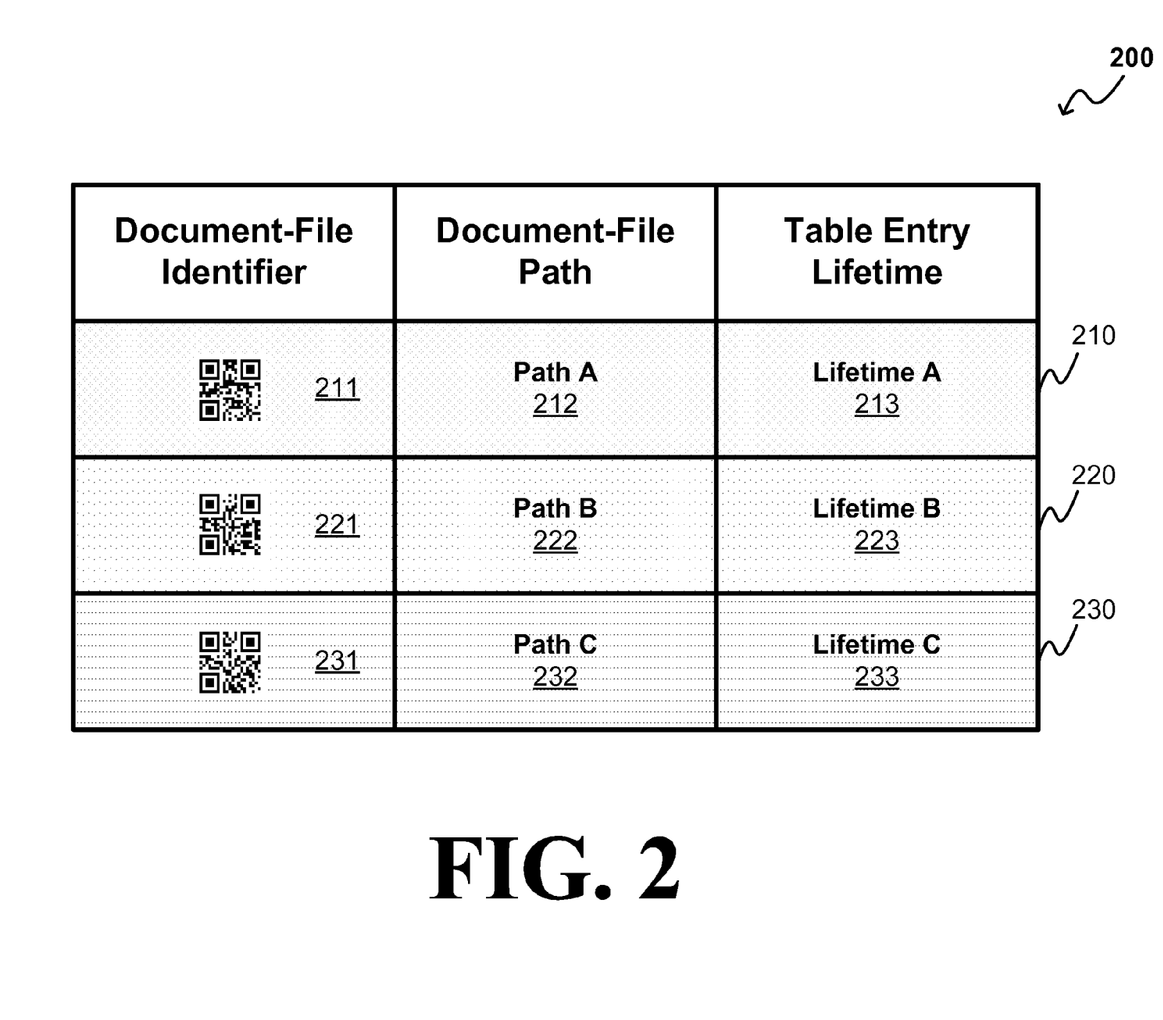
FIG. 2 is a tabular diagram illustrating a document-file table, according to one or more embodiments.

FIG. 2 is a tabular diagram illustrating a document-file table 200, according to one or more embodiments. The document-file table 200 is one example of a document-file table 151 that may be stored on a storage device 150. The document-file table 200 includes a plurality of document-file table entries, such as entry A 210, entry B 220, and entry C 230. In one embodiment, each of the document-file table entries includes an entry document-file identifier, an entry document-file path, and a table entry lifetime. Each entry document-file identifier in the document-file table 200 corresponds to an entry document-path and table-entry lifetime.

In one embodiment, document-file table 200 represents document-file table 151 and is stored within table storage device 150. In an example operation, an MFP within the plurality of MFPs 120 sends entry document-file identifier 211 (or a representation thereof) to table storage device 150. The document-file table 200 is then searched, and the entry document-file identifier 211 is found within entry A 210. Path A 212 is then returned to the MFP, which in turn retrieves the document file at Path A 212 from document storage device 110 and prints the document stored at Path A 212.

Figure 3:
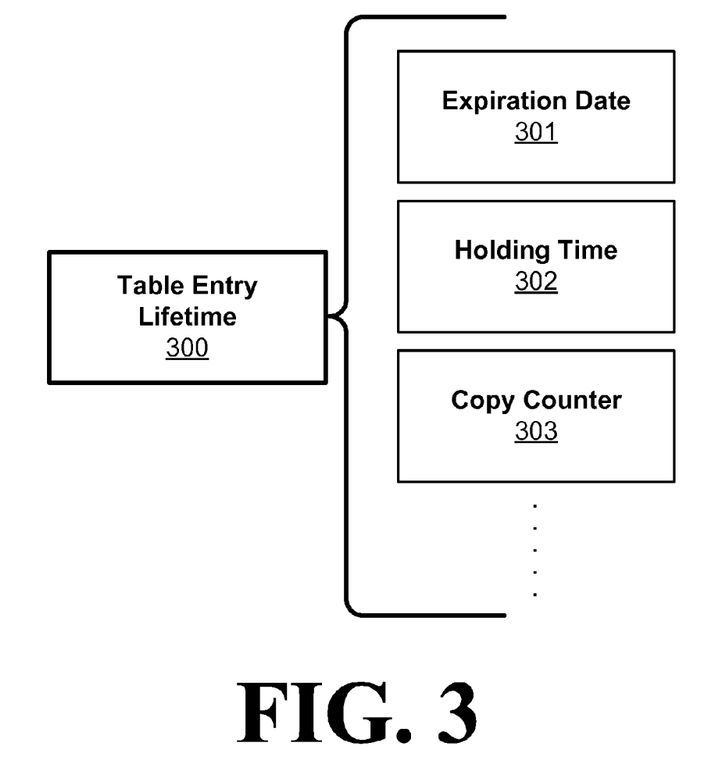
FIG. 3 illustrates a table entry lifetime, according to one or more embodiments.

FIG. 3 illustrates a table entry lifetime 300, according to one or more embodiments. The table entry lifetime 300 includes an expiration date and time 301, a holding time 302, and a copy counter 303. The expiration date and time 301 specifies a date and time in which the corresponding table entry is removed from the table. In some embodiments, the expiration date and time 301 can be quickly set to, for example, the next day at 12 AM, so that a document may only be reproduced during that day for enhanced security. The holding time 302 specifies an amount of time from printing until the table entry is removed from the table. The copy counter 303 specifies a number of remaining copies that may be printed using the corresponding document-file identifier. Any of the expiration date 301, the holding time 302, and the copy counter 303 may be set by a user, such as an administrator, before or after printing a coded document. The expiration date and time 301, the holding time 302, and the copy counter 303 are herein referred to as "lifetime parameters." The "lifespan" of a document-file table entry refers to the duration of the existence of the document-file table entry, such that the document-file table entry is removed after its lifespan.

In some embodiments, the lifetime parameters may be extended beyond the originally set expiration date and time 301, holding time 302, and copy counter 303. This extension may be done by, for example, an administrator that can access and modify the document-file table 151 manually, or the extension may be performed automatically based on preset conditions and the lifetime parameters. Some example conditions for automatic extension may include the copy counter 303 reaching zero long before the expiration date and time 301 or the holding time 302, or the expiration date and time 301 or holding time 302 expiring when there are many copies remaining in the copy counter 303. These examples indicate a case where the user set an insufficient number of copies required before the expiration date and time 301, or where the user set an expiration date and time 301 to be earlier than they had originally expected.

For example, a user sets the lifetime parameters upon printing a document on a Monday to have an expiration date and time 301 to 12 AM on the upcoming Saturday, and a copy counter 303 to "10." If the document is reproduced ten times on Tuesday, the copy counter will have reached "0," which would normally cause the document-file identifier 131 to expire; however, in some embodiments, having the copy counter 303 reach "0" long before the expiration date and time 301 may extend the lifetime of the document-file identifier 131 to allow for, for example, five more copies to be added to the copy counter 303. Alternatively, an administrator may be able to modify document-file table 151 manually to update the copy counter 303 to be "20" if, for example, a number of attendants at an upcoming meeting went from ten to fifteen, thus warranting a need to be prepared to make more copies. Note that the preceding examples only depict some extension conditions; other conditions may be applied in order to extend the lifetime of a document-file identifier 131.

A document-file table entry may be removed from a document-file table depending on which of the lifetime parameters are set. For example, if only the copy counter 303 is set, then the document-file table entry is removed when the copy counter 303 reaches zero. In other words, when the originally set number of copies has been produced using a specific document-file identifier, the document-file table entry is removed. Alternatively, if only the expiration date and time 301 is set, then any number of copies may be produced before the set expiration date and time 301, at which point the document-file table is removed. If none of the expiration date and time 301, the holding time 302, or the copy counter 303 are set, then the table entry lifetime 300 is considered "unlimited"; in other words, the table entry allows for any number of copies and will not expire at a certain date or time. Note that expiration date and time 301, holding time 302, and copy counter 303 are only three example lifetime parameters specifying the lifespan of a document-file table entry. Table entry lifetime 300 may have fewer or more lifetime parameters specifying the lifespan of a table entry, with any combination of parameters used without departing from the scope of the claims.

Figure 4:
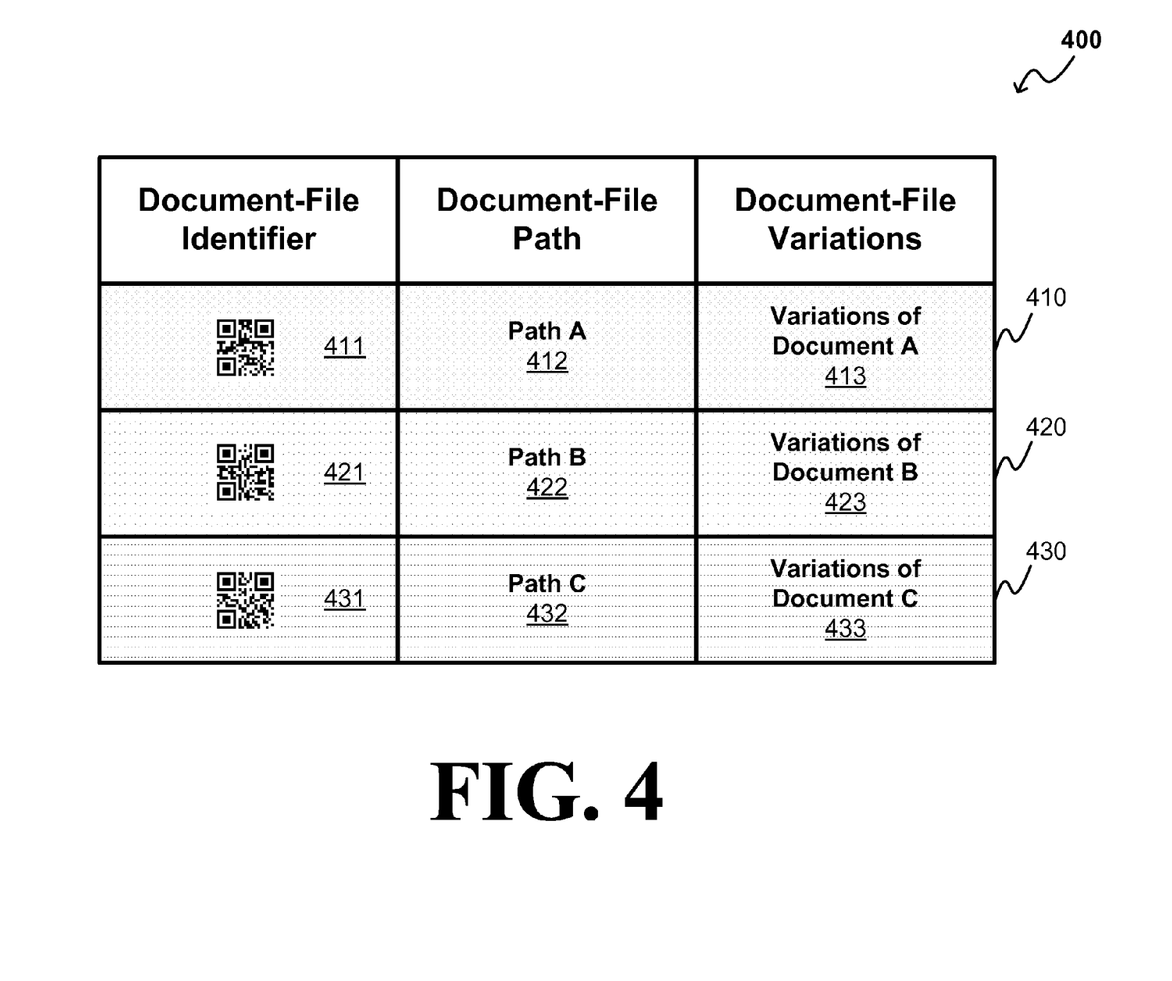
FIG. 4 is a tabular diagram illustrating a document-file table, according to one or more embodiments.

FIG. 4 is a tabular diagram illustrating a document-file table 400, according to one or more embodiments. The document-file table 400 is another example of a document-file table 151 that may be stored on a table storage device 150. The document-file table 400 contains a plurality of document-file table entries, such as entry A 410, entry B 420, and entry C 430. In one embodiment, each of the document-file table entries contains an entry document-file identifier, an entry document-file path, and document-file variations. Document-file variations may be document-file paths linked to document files that are similar to the scanned coded document. In some embodiments, the document-file variations may be different revisions of the scanned coded document, or different language translations of the scanned coded document. Each document-file identifier in the document-file table 400 corresponds to a document-file path and document-file variations.

In one embodiment, document-file table 400 is stored within storage device 150. In an example operation, an MFP within the plurality of MFPs 120 sends entry document-file identifier 411 to storage device 150. The document-file table 400 is searched, and the entry document-file identifier 411 (or a representation thereof) is found within entry A 410. Path A 412 and document-file variations 413 are then returned to the MFP. When a user scans a coded document having a document-file identifier corresponding to a number of document-file variations in a document-file table, the MFP reproducing the document may request a user to select a desired variation.

Figure 5:
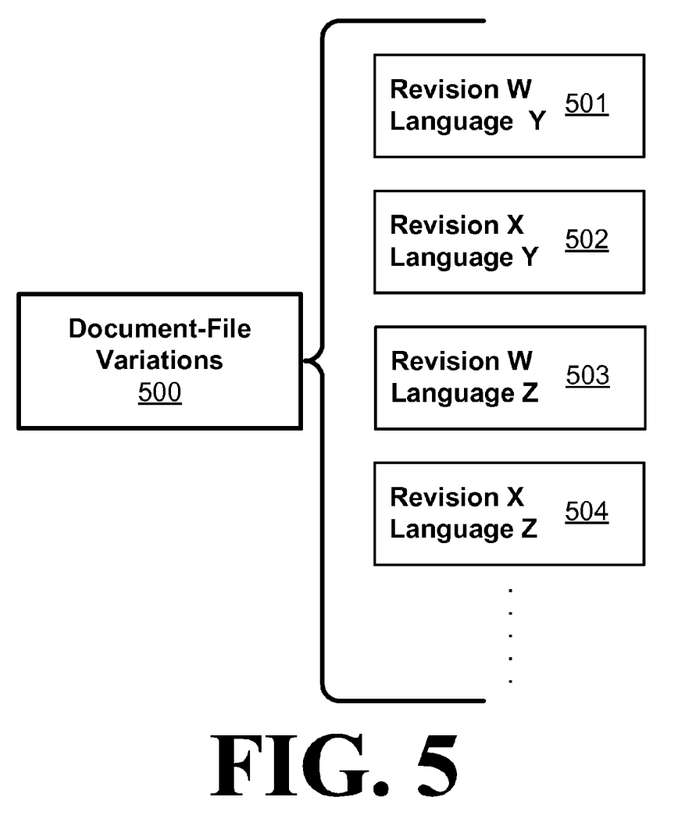
FIG. 5 illustrates a set of document-file variations, according to one or more embodiments.

FIG. 5 illustrates a set of document-file variations 500, according to one or more embodiments. As depicted in FIG. 5, the set of document-file variations 500 includes variations 501-504. The set of document-file variations 500 corresponds to a document-file identifier and a document-file path. A document-file variation may be any document that is similar to or appropriately associated with a scanned coded document, and may be defined using any number of parameters (herein referred to as "variation parameters"). Some example variation parameters include a previous or more recent revision of the coded document and a translated document in a different language. Note that revisions and languages are not the only variation parameters that may be used to define a specific variation. Any combination of variation parameters may be included within or excluded from a set of document-file variations 500, and the combinations of variation parameters included may vary among document-file table entries.

Described below is an example operation utilizing the document-file variations 500. A coded document including a document file located at document-file path 412 and a entry document-file identifier 411 is printed with MFP 121. A document-file table entry 410 is created in document-file table 400 containing the entry document-file identifier 411, the document-file path 412, and a set of document-file variations 413, and is stored onto storage device 150. In this example, the set of document-file variations 413 includes variations 501-504 as depicted in FIG. 5. When a user scans the coded document with MFP 122, MFP 122 uses entry document-file identifier 411 to retrieve the document-file path 412 and the set of document-file variations 413 from the document-file table 400. The MFP 122 then allows the user to copy the document by printing the document stored at document-file path 412, or select a desired variation from document-file variations 501-504 to be printed. If, for example, the user wishes to produce the document with revision "X" in language "Z," variation 504 would be selected on the MFP 122 and that document-file variation would be printed.

It should be noted that a document-file table entry may include any combination or subset of an entry document-file identifier, an entry document-file path, a table entry lifetime, and a set of document-file variations. Additional information may also be included within a document-file table entry, such as user notes and/or additional copying restrictions.

Figure 6:
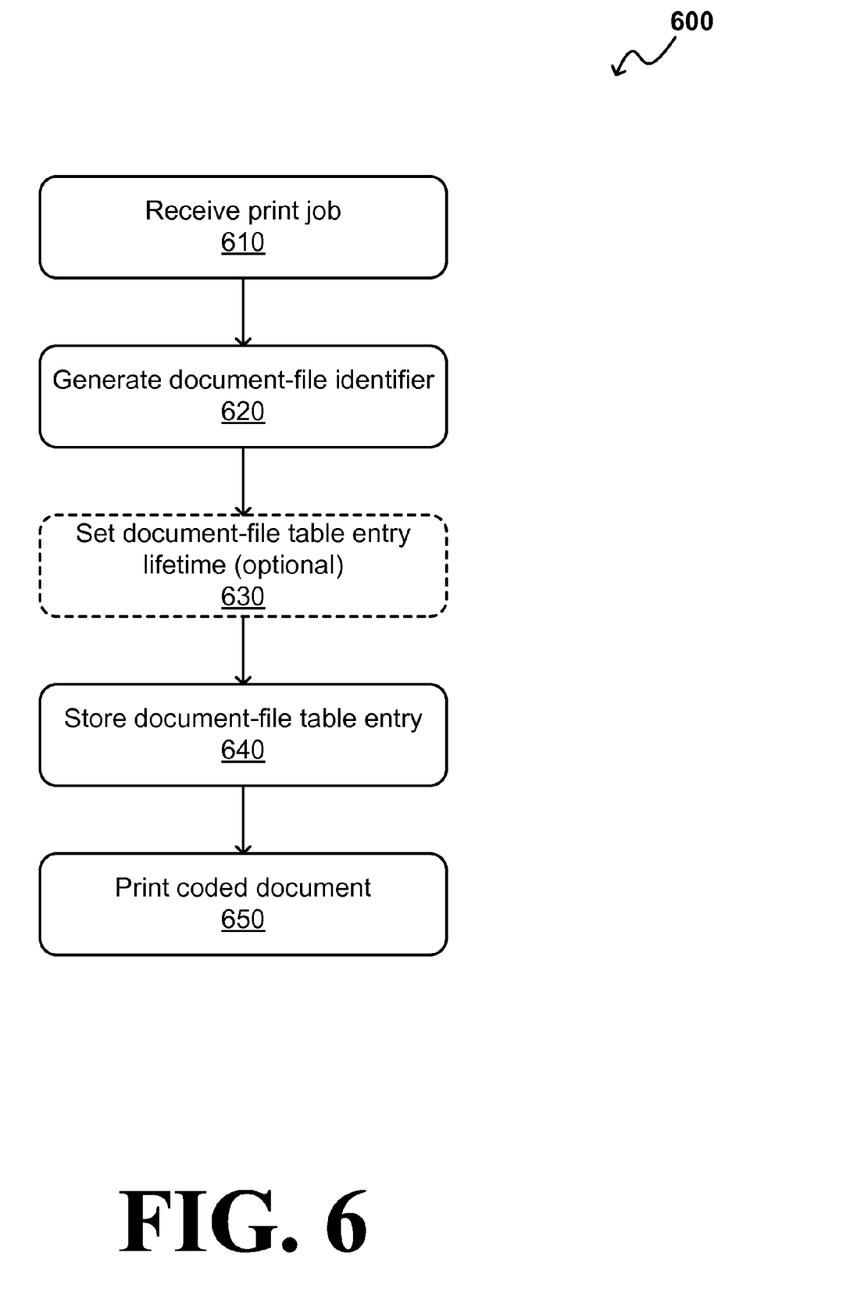
FIG. 6 is a flowchart depicting a printing method, according to one or more embodiments.
Figure 7:
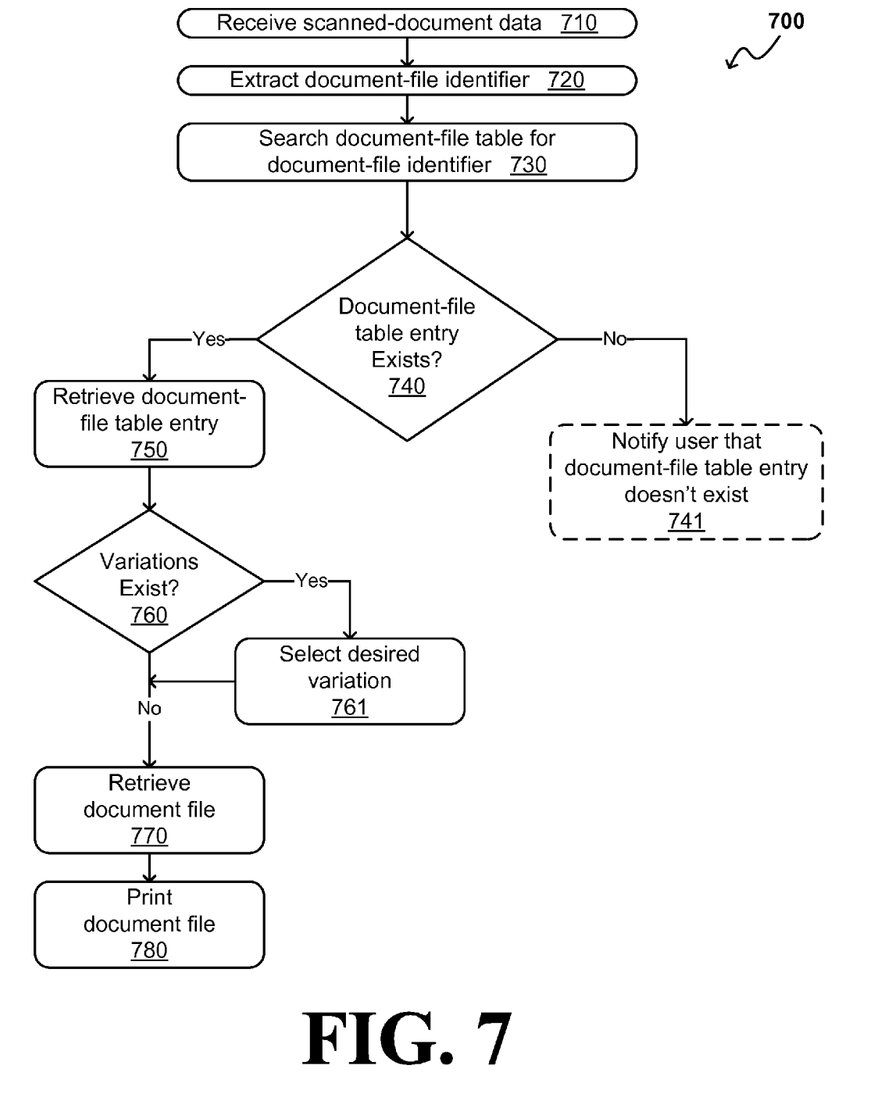
FIG. 7 is a flowchart depicting a scanning method, according to one or more embodiments.

FIG. 6 is a flowchart depicting a printing method 600, according to one or more embodiments. The printing method 600 describes the process of printing a coded document that may be scanned and reproduced using, for example, the scanning method 700.

At step 610, a print job—a command that includes document-file data and a document-file path of a document file—is received. In one embodiment, the print job is received at an image forming apparatus. The image forming apparatus may be an MFP, such as MFP 121.

At step 620, a document-file identifier that is unique to the document-file path of the document file in the received print job is generated. In one embodiment, a processor on the image forming apparatus described in step 610 may be used to generate the document-file identifier.

At optional step 630, a user sets lifetime parameters that specify a document-file table entry lifespan, as depicted in FIG. 3. This may require user input on a device sending the received print job at step 610, such as a personal computer (PC) or smartphone. Alternatively, the user input may be provided on a device receiving the print job at step 610, such as an MFP.

In yet another alternative, no user input is required. In one example, a default table entry lifetime may be used. A default table entry lifetime may, for example, include a twenty four hour holding time and set the copy counter to ten. In another example, a table entry lifetime is not implemented in the document-file table, and thus no user input would be required. Optional step 630 may be performed before step 610, after step 650, or between any of the steps 610-650.

At step 640, a document-file table entry containing at least the generated document-file identifier and the document-file path is stored in a document-file table. The document-file table may be located on a storage device connected to an MFP, for example.

At step 650, a coded document containing the document-file data and the document-file identifier is printed. An image forming apparatus, such as an MFP, may be used to print the coded document.

FIG. 7 is a flowchart depicting a scanning method 700, according to one or more embodiments. The scanning method 700 may scan a coded document produced, for example, using printing method 600.

At step 710, scanned-document data is received. The scanned-document data includes at least a document-file identifier, and may or may not include document-file data. The scanned-document data may originate from an optical scan of a coded document performed by an image reading device. Alternatively, the scanned-document data may originate from an electromagnetic induction device capable of reading electromagnetic induction signatures, such as an RFID tag reader. An imaging device and an RFID tag reader may be used in combination as well.

At step 720, the document-file identifier is extracted from the scanned-document data from step 710. The extraction may be simple if the device used to scan the scanned-document data includes functionality to read the document-file identifier directly. In other embodiments, the document-file identifier must be extracted from, for instance, an optical scan. For example, if the document-file identifier is a text code printed onto a page, the scanned-document data may not already have document-file identifier extracted; in this example, a software method, such as optical character recognition (OCR), may be required to extract the document-file identifier from the scanned-document data.

At step 730, the extracted document-file identifier is searched within a document-file table. The document-file identifier may be stored on a storage device, which may be a component of an MFP or accessed by connection to a network.

At step 740, a decision is made depending on whether or not the extracted document-file identifier is found within the document-file table. If the extracted document-file identifier is not found within the document file table, then no information about a document-file path or a path to a variation of a document-file is retrieved. As a result, no printing is executed. Optionally, the user may be notified that no document-file table entry exists at step 741.

A document-file table entry corresponding to the extracted document-file identifier may not exist because the extracted document-file identifier was never registered; for instance, if the document-file identifier format for pull-copy system 100 is a specific type of two-dimensional matrix barcode, any other two-dimensional matrix barcodes of that specific type may be scanned, regardless of whether or not it was generated using the pull-copy system 100.

A document-file table entry corresponding to the extracted document-file identifier may also not exist because the table entry lifetime expired. If the table entry lifetime is not set to be "unlimited," then it may expire and subsequently be removed from the document-file table. For example, if the expiration date and time specified in the table entry lifetime is on a date previous of the date when a coded document is scanned, then that document-file table entry has already been removed; in other words, a document-file table entry whose table entry lifetimes have expired no longer exists in the document-file table.

If the extracted document-file identifier is found within the document-file table, then the document-file table entry corresponding to the extracted document-file identifier is retrieved in step 750.

The following step 760 determines whether or not document-file variations exist in the retrieved document-file table entry.

If the document-table entry contains document-file variations, then a desired document file—the document file stored at the document-file path or one of the document-file variations in the document-file table entry—is selected at step 761. The selection of the desired document file may, for example, be achieved with a user input device on an image forming apparatus. Alternatively, the document-file variation may be predetermined and encoded into the document-file identifier, such that scanning a document-file identifier would print a specific document-file variation without any user input.

If the document-file table entry does not contain any document-file variations, then the selected document file to be used in subsequent steps is the document file stored at the document-file path from the document-file table entry. No document-file variations may be present, for example, if the document only contains a single revision and is only stored in a single language.

At step 770, the selected document file (either the document file stored at the document-file path or one of the document file variations) is retrieved. The selected document file may be stored, for example, on a storage device such as document storage device 110.

At step 780, the retrieved document file is printed. The printing may be accomplished using an image forming apparatus, such as an MFP.

While particular aspects and examples are disclosed herein, other aspects and examples will be apparent to those skilled in the art in view of the foregoing teaching. The various aspects and examples disclosed herein are for illustration purposes only and are not intended to be limiting, with the true scope and spirit being indicated by the following claims.

What is claimed is:

1. A method comprising:
   receiving a print job, wherein the print job includes document-file data corresponding to a document file stored at a given document-file path;
   generating a document-file identifier based on the print job;
   storing a document-file table entry in a document-file table, wherein the document-file table entry includes the document-file identifier and the given document-file path;
   printing a coded document, wherein the coded document includes the document-file data and the document-file identifier,
   receiving scanned-document data produced from the coded document that has been printed with the document-file identifier included therein and scanned for printing a copy, wherein the scanned-document data includes the document-file identifier;
   extracting the document-file identifier from the received scanned-document data;
   searching the document-file table for the extracted document-file identifier, wherein the document-file table includes one or more document-file table entries, wherein each of the one or more document-file table entries includes an entry document-file identifier and one or more document-file paths at which one or more corresponding document files are stored, and wherein searching the document-file table includes searching the one or more document-file table entries for a matching document-file table entry that includes the extracted document-file identifier; and
   if the matching document-file table entry exists in the document-file table, printing, as the copy, a document file stored at one of the one or more document-file paths included in the matching document-file table entry.

2. The method of claim 1, wherein each document-file table entry further includes a table entry lifetime, the table entry lifetime including at least one of:
   an expiration date and time indicating a date and a time when the document-file table entry is to be removed from the document-file table,
   a holding time indicating a remaining length of time before the document-file table entry is removed from the document-file table, and
   a copy counter indicating a remaining number of copies before the document-file table entry is removed from the document-file table.

3. The method of claim 1, wherein each document-file table entry further includes a plurality of document-file variations, wherein each of the plurality of document-file variations includes a corresponding document-file path.

4. The method of claim 3, wherein each of the plurality of document-file variations includes one or more variation parameters, the one or more variation parameters distinguishing each of the plurality of document-file variations from other variations in the plurality of variations, the one or more variation parameters including at least one of:
   a revision, and
   a language.

5. The method of claim 1, wherein the coded document has a first side and a second side.

6. The method of claim 5, wherein printing the coded document comprises printing the document-file data on the first side of the coded document or the second side of the coded document.

7. The method of claim 5, wherein printing the coded document comprises printing the document-file identifier on the first side of the coded document or the second side of the coded document.

8. The method of claim 1, wherein the document-file identifier comprises at least one of a linear barcode, a matrix barcode, a radio-frequency identification tag, a text code, or a code embedded within an image.

9. The method of claim 1, further comprising:
   if the matching document-file table entry exists, determining if the matching document-file table entry includes a plurality of document-file variations, wherein each of the document-file variations includes a corresponding document-file path.

10. The method of claim 9, wherein:
(1) if the matching document-file table entry does not include the plurality of document-file variations, the matching document-file table entry includes the given document-file path, wherein printing comprises:
  printing, as the copy, the document file stored at the given document-file path, and
(2) if the matching document-file table entry includes the plurality of document-file variations, the method further comprises selecting a desired document-file variation from the plurality of document-file variations, wherein printing comprises:
  printing, as the copy, a document file stored at a document-file path corresponding to the desired document-file variation.

11. A method comprising:
receiving scanned-document data produced from a coded document that has been printed with a document-file identifier included therein and scanned for printing a copy, wherein the scanned-document data includes the document-file identifier;
extracting the document-file identifier from the scanned-document data;
searching a document-file table that includes one or more document-file table entries for the extracted document-file identifier, wherein each of the one or more document-file table entries includes an entry document-file identifier and one or more document-file paths at which one or more corresponding document files are stored, and wherein searching the document-file table includes searching the one or more document-file table entries for a matching document-file table entry that includes the extracted document-file identifier; and
if the matching document-file table entry exists in the document-file table, printing, as the copy, a document file stored at one of the one or more document-file paths included in the matching document-file table entry.

12. The method of claim 11, wherein the document-file table is stored on a table storage device.

13. The method of claim 11, wherein the one or more document-file table entries is a plurality of document-file table entries, and wherein searching the plurality of document-file table entries for the matching document-file table entry comprises:
comparing the extracted document-file identifier to each entry document-file identifier in the plurality of document-file table entries of the document-file table;
determining that the matching document-file table entry does not exist if no entry document-file identifier matches the extracted document-file identifier; and
determining that the matching document-file table entry exists if a given entry document-file identifier matches the extracted document-file identifier.

14. The method of claim 11, further comprising providing a notification if the matching document-file table entry does not exist.

15. The method of claim 11, further comprising:
if the matching document-file table entry exists, determining if the matching document-file table entry includes a plurality of document-file variations, wherein each of the document-file variations includes a corresponding document-file path.

16. The method of claim 15, wherein, if the matching document-file table entry does not include the plurality of document-file variations, the matching document-file table entry includes only one document-file path, and printing comprises:
printing, as the copy, a document file stored at the one document-file path included in the matching document-file table entry.

17. The method of claim 15, wherein if the matching document-file table entry includes the plurality of-document-file variations, the method further comprises selecting a desired document-file variation from the plurality of document-file variations, and printing comprises:
printing, as the copy, a document file stored at a document-file path corresponding to the desired document-file variation.

18. The method of claim 11, wherein each document-file table entry further includes a document-file table entry lifetime, and wherein the document-file table entry lifetime includes at least one of:
an expiration date and time indicating a date and a time when the document-file table entry is to be removed from the document-file table,
a holding time indicating a remaining length of time before the document-file table entry is removed from the document-file table, and
a copy counter indicating a remaining number of copies before the document-file table entry is removed from the document-file table.

19. A system comprising:
an image forming apparatus;
a storage unit for storing a document-file table; and
a processor configured to perform functions comprising:
  (1) performing a coded document printing method, including:
    generating a document-file identifier based on a print job that includes document-file data corresponding to a document file stored at a given document-file path,
    storing a document-file table entry in a document-file table, wherein the document-file table entry includes the document-file identifier and the given document-file path, and
    printing a coded document, wherein the coded document includes the document-file data and the document-file identifier; and
  (2) performing a coded document scanning method, including:
    receiving scanned-document data produced from the coded document that has been printed with the document-file identifier included therein and scanned for printing a copy, wherein the scanned-document data includes the document-file identifier,
    extracting the document-file identifier from the received scanned-document data,
    searching the document-file table for the extracted document-file identifier, wherein the document-file table includes one or more document-file table entries, wherein each of the one or more document-file table entries includes an entry document-file identifier and one or more document-file paths at which one or more corresponding document files are stored, and wherein searching the document-file table includes searching the one or more document-file table entries for a matching document-file table entry that includes the extracted document-file identifier, and if the matching document-file table entry exists in the document-file table, printing, as the copy, a document file stored at one of the one or more document-file paths included in the matching document-file table entry.

20. The system of claim 19, wherein the storage unit comprises at least one of a nonvolatile storage device, a server, private cloud storage, and public cloud storage.

* * * * *